United States Patent
Shin

(10) Patent No.: US 9,449,548 B2
(45) Date of Patent: Sep. 20, 2016

(54) ORGANIC LIGHT EMITTING DISPLAY DEVICE AND METHOD FOR DRIVING THEREOF

(75) Inventor: Kwang-Sub Shin, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 479 days.

(21) Appl. No.: 12/966,737

(22) Filed: Dec. 13, 2010

(65) Prior Publication Data
US 2011/0273441 A1    Nov. 10, 2011

(30) Foreign Application Priority Data

May 10, 2010  (KR) .................. 10-2010-0043505

(51) Int. Cl.
*H04N 9/47* (2006.01)
*G09G 3/32* (2016.01)
(Continued)

(52) U.S. Cl.
CPC ......... *G09G 3/3225* (2013.01); *G02B 27/2264* (2013.01); *G09G 3/003* (2013.01); *H04N 13/0438* (2013.01); *H04N 13/0452* (2013.01); *H04N 13/0497* (2013.01); *G09G 3/3266* (2013.01); *G09G 2300/0842* (2013.01); *G09G 2300/0861* (2013.01); *G09G 2310/02* (2013.01);
(Continued)

(58) Field of Classification Search
CPC ........... H04N 13/044; H04N 13/0497; H04N 13/0059; G02B 27/017; G02B 27/0172
USPC ............... 348/53, 55; 345/419, 427, 211
IPC ....................................... G06T 15/00
See application file for complete search history.

(56) References Cited

U.S. PATENT DOCUMENTS 6,380,689 B1    4/2002 Okuda
6,731,276 B1 *  5/2004 Ishizuka ............. G09G 3/3266
                                                    315/169.3
(Continued)

FOREIGN PATENT DOCUMENTS

CN    101123734 A    2/2008
CN    101164348 A    4/2008
(Continued)

OTHER PUBLICATIONS

EPO Office action dated Nov. 5, 2012 for corresponding EP Application No. 11165336.6, 6 pps.
(Continued)

*Primary Examiner* — Thao X Le
*Assistant Examiner* — Long Le
(74) *Attorney, Agent, or Firm* — Christie, Parker & Hale, LLP

(57) ABSTRACT

An organic light emitting display device for displaying 2D and 3D image, the organic light emitting display device including a scan driver for supplying a scan signal to a plurality of scan lines; a data driver for supplying a data signal to a plurality of data lines; a plurality of pixels that located at crossing regions of the scan lines and the data lines for controlling a current flowing from a first power driver to a second power driver via an organic light emitting diode; a data processor for classifying data supplied from outside as 2D or 3D data, and for producing 2D or 3D; and a timing controller for transmitting 2D or 3D data supplied from the data processor to the data driver, wherein the timing controller is configured to set the pixels in a non-emission state during a scan period.

13 Claims, 9 Drawing Sheets

(51) Int. Cl.
*G02B 27/22* (2006.01)
*G09G 3/00* (2006.01)
*H04N 13/04* (2006.01)

(52) U.S. Cl.
CPC ... *G09G 2310/0262* (2013.01); *G09G 2310/061* (2013.01); *G09G 2310/063* (2013.01); *G09G 2330/028* (2013.01)

(56) References Cited

U.S. PATENT DOCUMENTS

| | | | |
|---|---|---|---|
| 7,345,659 | B2 | 3/2008 | Chang |
| 2004/0174349 | A1 | 9/2004 | Libsch et al. |
| 2005/0140609 | A1 | 6/2005 | Akimoto et al. |
| 2006/0139266 | A1* | 6/2006 | Choi ............................. 345/77 |
| 2007/0242068 | A1* | 10/2007 | Han ................. H04N 13/0409 345/427 |
| 2008/0143651 | A1* | 6/2008 | Choi et al. .................... 345/76 |
| 2008/0191964 | A1 | 8/2008 | Spengler |
| 2010/0045784 | A1* | 2/2010 | Okazaki ............ H04N 13/0029 348/55 |

FOREIGN PATENT DOCUMENTS

| | | |
|---|---|---|
| EP | 2 265 033 A2 | 12/2010 |
| EP | 2265 033 A2 * | 12/2010 |
| EP | 2265033 A2 * | 12/2010 |
| JP | 10-333641 | 12/1998 |
| JP | 2003-280582 | 10/2003 |
| JP | 2004-295131 | 10/2004 |
| JP | 2007-110683 | 4/2007 |
| JP | 2007-286623 | 11/2007 |
| JP | 2010-49049 | 3/2010 |
| JP | 2010-250111 | 11/2010 |
| KR | 10-2006-0073681 | 6/2006 |
| KR | 10-2007-0070327 | 7/2007 |
| KR | 10-2008-0095799 | 10/2008 |
| KR | 10-2010-0134876 A | 12/2010 |
| TW | 200708176 A | 2/2007 |
| WO | WO 2009/069026 A2 | 6/2009 |

OTHER PUBLICATIONS

KIPO Office action dated Apr. 30, 2012, for Korean priority application 10-2010-0043505, (1 page).
European Patent Office Action dated Oct. 25, 2011 in EP application 11165336.6, 15 pages.
KIPO Office action dated Sep. 28, 2011, for priority application 10-2010-0043505, 6 pages.
European Search Report dated Aug. 1, 2011, for corresponding European Patent application 11165336.6, 6 pages.
Japanese Office action dated Apr. 22, 2014 issued in JP 2010-228868, 2 pages.
SIPO Office action dated Apr. 23, 2014, for corresponding Chinese Patent application 201110051077.8, (7 pages).
JPO Office action dated Apr. 22, 2014, for corresponding Japanese Patent application 2010-228868, (2 pages).
Taiwan Office action dated Jul. 13, 2015, for corresponding Taiwanese Patent application 100100643, (5 pages).

* cited by examiner

ORGANIC LIGHT EMITTING DISPLAY DEVICE AND METHOD FOR DRIVING THEREOF

CROSS-REFERENCE TO RELATED APPLICATIONS

This application claims priority to and the benefit of Korean Patent Application No. 10-2010-0043505, filed on May 10, 2010, in the Korean Intellectual Property Office, the entire content of which is incorporated herein by reference.

BACKGROUND

1. Field

Embodiments of the present invention relate to an organic light emitting display device and a method of driving thereof, and more particularly, to an organic light emitting display device that displays 2D and 3D images, and a method of driving thereof.

2. Discussion of Related Art

Recently, a variety of flat panel displays that reduce or address disadvantages of cathode ray tubes, such as weight and volume, have been developed. Typical flat panel displays include liquid crystal displays, field emission displays, plasma display panels, organic light emitting display devices, etc.

The organic light emitting display device of the flat display devices displays an image using organic light emitting diodes that emit light by recombination of electrodes and holes, and has high response speed and is driven with low power consumption.

In general, organic light emitting display devices are classified into passive matrix organic light emitting display devices (PMOLEDs) and active matrix organic light emitting display devices (AMOLEDs), in accordance with the types of driving the organic light emitting diodes.

An active matrix organic light emitting display device typically includes a plurality of scan lines, a plurality of data lines, a plurality of power source lines, and a plurality of pixels coupled with the lines and arranged in a matrix. A pixel commonly includes an organic light emitting diode, a driving transistor for controlling the amount of current supplied to the organic light emitting diode, a switching transistor for transmitting a data signal to the driving transistor, and a storage capacitor for maintaining voltage of the data signal.

The types of organic light emitting display devices may be divided up into organic light emitting display devices for displaying 2D images and organic light emitting display device for displaying 3D images in response to an image (or image data) to display. The organic light emitting display devices for 2D images are for displaying 2D images on a panel and include most organic light emitting display devices that have been used so far. The organic light emitting display devices for 3D images are for displaying 3D images on a panel, and presently, research on this is actively in progress.

Meanwhile, the organic light emitting devices are generally only capable of displaying only 2D or 3D in the panel, as mentioned above, and as such two display devices are required in order to watch 2D and 3D images. Therefore, it would be useful to have an organic light emitting display device that is capable of displaying 2D and 3D images at the same time.

SUMMARY

Embodiments of the present invention are directed to an organic light emitting display device that can display 2D and 3D images, and a method for driving thereof.

According to one embodiment, there is provided the organic light emitting display device including: a scan driver for supplying a scan signal to a plurality of scan lines; a data driver for supplying a data signal to a plurality of data lines; a plurality of pixels located at crossing regions between the scan lines and the data lines, and for controlling a current flowing from a first power driver to a second power driver via an organic light emitting diode in accordance with the data signal; a data processor for classifying data supplied from outside the organic light emitting display device as 2D or 3D data, and for producing 2D or 3D data of at least two frames by using 2D or 3D data of one frame; and a timing controller for transmitting 2D or 3D data supplied from the data processor to the data driver, wherein the timing controller is configured to set the pixels in a non-emission state during a scan period during which the scan signal is supplied to the scan lines during one frame period.

The data processor may include a data divider for classifying the data into 2D or 3D data by using a distinguishing bit of the data supplied from the outside; a 3D data processor for producing data for a frame corresponding to a left eye image and data for a frame corresponding to a right eye image by using 3D data of one frame; a 2D data processor for producing data for at least two frames by using 2D data of one frame; and a data transmitter for transmitting data from the 3D data processor and the 2D data processor to the timing controller.

The data processor may be supplied with data from outside at a first driving frequency and may be configured to transmit 3D data and 2D data to the timing controller at a second driving frequency and the second driving frequency may be greater than the first driving frequency. The first driving frequency may be 60 Hz and the second driving frequency may be 120 Hz. The organic light emitting display device may further include a wireless transmitter coupled to the timing controller for transmitting a wireless signal corresponding to the scan period; and a pair of shutter glasses that may be configured to synchronize a response period with the scan period in accordance with the wireless signal.

The organic light emitting display device may further include a first power driver for producing the first power and a second power driver for producing the second power. The timing controller may be configured to control the first power driver to supply the first power at a low level during the scan period during one frame and the first power at a high level during the emission period. The timing controller may be configured to control the second power driver to supply the second power at a high level during the scan period among one frame and the second power at a low level during the emission period. The organic light emitting display may further include an emission control line coupled to the pixels in common, and the timing controller may be configured to control the scan driver to supply an emission control signal to the emission control line during the scan period.

According to one embodiment of the present invention, a method for driving an organic light emitting display device includes supplying data from outside the organic light emitting display device; classifying the data of one frame into 2D data or 3D data by using a distinguishing bit of the data; producing data of a frame corresponding to a left eye image and data of a frame corresponding to a right eye image by using the 3D data of one frame or producing data of two frames by using the 2D data of one frame when classifying into 2D data; producing a data signal by using the produced 3D data or the produced 2D data; setting a plurality of pixels in a non-emission state during a scan period for supplying the data signal to the pixels during one frame period; and setting the pixels to emit light in accordance with the data signal during an emission period.

The method may further include controlling a current flowing from a first power driver to a second power driver via the organic light emitting diode during the emission period using the pixels in accordance with the data signal. The method may further include setting a voltage of the first power at a low level during the scan period, and setting the voltage of the first power at a high level during the emission period.

The method may further include setting a voltage of the second power at a high level during the scan period, and setting the voltage of the second power at a low level during the emission period. The pixels may include a control transistor coupled between the organic light emitting diode and the first power driver, and the method may further include turning off the control transistor during the scan period and turning on the control transistor during the emission period. An i-th (here, i is a natural number) frame may include the left eye image and i+1 frame may include the right eye image when displaying image using the 3D data. The method may also include synchronizing the scan period between an emission period of the i-th frame and an emission period of the (i+1)-th frame with a response period of a pair of shutter glasses.

According to an organic light emitting display device and a method for driving thereof according to embodiments of the present invention, 2D and 3D images can be displayed in one panel by classifying data supplied from outside into 2D data and 3D data, and producing additional frame data in accordance with to the 2D data and the 3D data, respectively.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
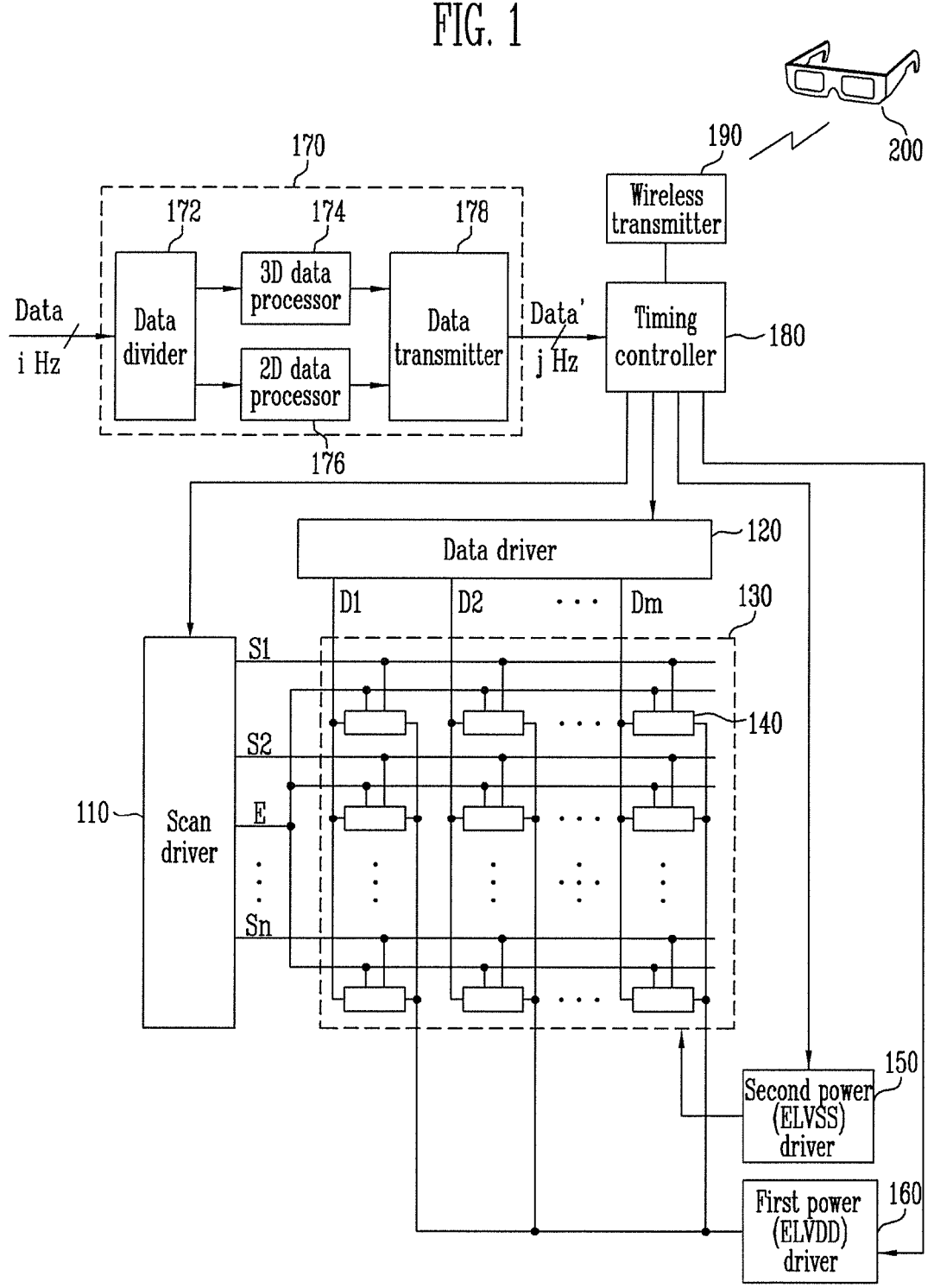
FIG. 1 is a block diagram illustrating an organic light emitting display device according to an embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

Hereinafter, exemplary embodiments, in which one skilled in the field can easily perform the present invention, will be described in more detail with reference to FIG. 1 to FIG. 13B.

FIG. 1 is a block diagram illustrating an organic light emitting display device according to an embodiment of the present invention.

Referring to FIG. 1, the organic light emitting display device according to an embodiment of the present invention includes: a display unit 130 including pixels 140 that are coupled with scan lines S1 to Sn, a light emission control line E, and data lines D1 to Dm; a scan driver 110 that supplies a scan signal to the scan lines S1 to Sn and supplies a light emission control signal to the light emission control line E; a data driver 120 that supplies a data signal to the data lines D1 to Dm; a first power driver 160 for supplying a first power ELVDD to the pixels 140; a second power driver 150 for supplying a second power ELVSS to the pixels 140; and a timing controller 180 for controlling the scan driver 110, the data driver 120, the first power driver 160, and the second power driver 150.

In addition, the organic light emitting display device according to one embodiment of the present invention includes a data processor 170 that divides data inputted from outside into 2D and 3D Data' and delivers the Data' to the timing controller 180, and a wireless transmitter 190 for emitting a wireless signal of (or corresponding to) a period expressing black during one frame period (e.g., a non-emission period).

The scan driver 110 supplies the scan signal to the scan lines S1 to Sn during one frame period. The scan driver 110 also supplies the light emission control signal to the light emission control line E during the scan period.

In this case, the light emission control signal is set at a voltage level at which a transistor can be turned-off, and the scan signal is set at a voltage level at which a transistor can be turned-on. Therefore, when the scan signal is set at a high level (or low level) voltage, the light emission control signal is set at a low level (or high level) voltage.

In one embodiment, the light emission control line E is coupled with all of the pixels 140, and the pixels 140 during supplying the light emission control signal are set in a non-light emitting state. In other words, according to one embodiment of the present invention, the pixels 140 are set in the non-light emitting state by supplying the light emission control signal during the scan period of one frame period, and the pixels 140 are set in the light emitting state by stopping the supply of the light emission control signal during an emission period (e.g., in periods other than the scan period of one frame period).

The data driver 120 supplies the data signal to the data lines D1 to Dm in synchronization with the scan signal that is successively supplied to the scan lines S1 to Sn.

The display unit 130 includes pixels 140 disposed at crossing regions of the scan lines S1 to Sn and the data lines D1 to Dm. The pixels 140 are supplied with the first power ELVDD and the second power ELVSS. The pixels 140 as mentioned above control current that is supplied from the first power driver 160 to the second power driver 150 via the organic light emitting diode in response to the data signal during the emission period of one frame period.

The first power driver 160 supplies the first power ELVDD to the pixels 140. The first power driver 160 as mentioned above supplies a high level voltage as the first power ELVDD to be supplied with a second power ELVSS from the second power driver 150 to the organic light emitting diode.

Meanwhile, according to one embodiment of the present invention, the light emission control line E can be omitted, and the pixels 140 can be set in the non-light emitting state during the scan period using the first power ELVDD or the second power ELVSS. For example, the pixels 140 can be set in the non-light emitting state by setting the first power ELVDD to the low level voltage or the second power ELVSS to the high level voltage during the scan period. This will be described in more detail in connection with the structure of the pixels 140.

The data processor 170 classifies the data inputted (or supplied) from outside into 2D or 3D data, and then produces data for additional frame by using the classified data. To achieve this, the data processor 170 includes a data divider 172, a 3D data processor 174, a 2D data processor 176, and a data transmitter 178. In this case, the data processor 170 changes from i-th (here, i is a natural number) (or first) driving frequency (Hz) to j-th (here, j is a natural number greater than i) (or second) driving frequency (Hz), and then supplies data to the timing controller 180. For convenience of explanation, it is assumed that i (or the first driving frequency) is 60 Hz and j (or the second driving frequency) is 120 Hz.

The data divider 172 distinguishes data inputted from outside system between 2D or 3D data, and supplies the distinguishing data to 3D data processor 174 or 2D data processor 176.

More specifically, the data inputted from the outside includes distinguishing bits for identifying 2D or 3D images. The data divider 172 distinguishes data images by using the distinguishing bits included in data and supplies data corresponding to 2D images to the 2D data processor 176 and data corresponding to 3D images to the 3D data processor 174.

Figure 2:
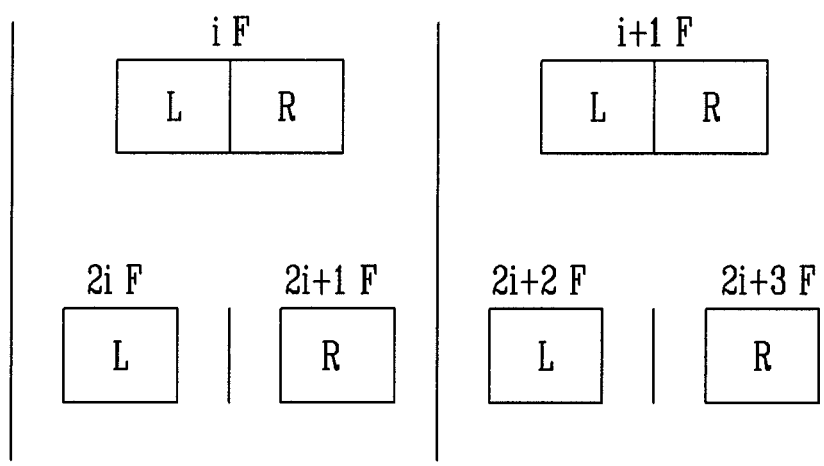
FIG. 2 illustrates an operation process of a 3D data processor as depicted in FIG. 1.

The 3D data processor 174 divides (or outputs) a left eye image and right eye image by using data that is inputted (or supplied) to the 3D data processor 174. More specifically, the data of 3D image for one frame that is inputted from the data divider 172 includes the left eye and right eye images. The 3D data processor 174 produces two frames of data by dividing the left eye (L) image and the right eye (R) image included in one frame as depicted in FIG. 2. In this case, because two frames of data are produced by using one frame of data, the scale-up of the left eye (L) and right eye (R) frame image that are newly produced are improved. Various methods (including, e.g., dithering) that are known can be used as the scale-up method. For example, the scale can be improved by using k (here, k is a natural number) pixel data (it is assumed as the left eye) inputted from the data divider 172 as k and k+1 pixel data.

The 2D data processor 176 produces data for two frames by using the data of one frame that is inputted to the 2D data processor 176. A 2D data processor 176 produces the data for two frames by using the data of one frame by using various methods that are now known. For example, the 2D data processor 176 can add one frame by copying the data of one frame as it is. In addition, the 2D data processor 176 may produce the additional frame by being inputted (or supplied) two adjacent frames, and changing a part of (or interpolating) data between two frames that are inputted, e.g., by using Motion Estimation Motion Compensation (MEMC).

The data transmitter 178 transfers Data' supplied from the 3D data processor 174 or Data' supplied from the 2D data processor 176 to the timing controller 180.

The timing controller 180 transfers Data' that is supplied to the timing controller 180 to the data driver 120. The timing controller 180 sets up the width of the scan period (i.e., the non-emission period) of one frame by controlling any one of the drivers among the scan driver 110, the second power driver 150, and the first power driver 160. For example, the timing controller 180 can set the pixels 140 in the non-light emitting state during 50% of one frame period.

Meanwhile, for one embodiment of the present invention, the width of the scan period at the timing controller 180 can be set as various types. For example, the timing controller 180 can control the width of the scan period corresponding to a signal inputted from user. In other words, when displaying a video, the width of the scan period may be set to be wide, and when displaying a picture, the width of the scan period may be set to be narrow. When displaying a video, as the scan period becomes wider, the image having a little more feeling of movement can be displayed.

The wireless transmitter 190 transmits a wireless signal corresponding to the scan period of one frame period. The pair of shutter glasses 200 that receives the wireless signal synchronize the response time thereof with the scan period.

Figure 3:
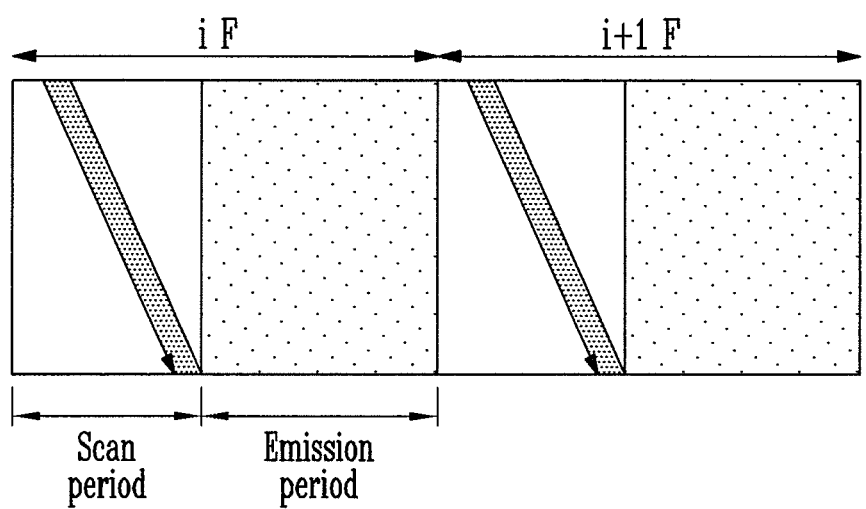
FIG. 3 illustrates two frame periods according to an embodiment of the present invention.

FIG. 3 illustrates two frame periods according to an embodiment of the present invention.

Referring to FIG. 3, the organic light emitting display device according to one embodiment of the present invention is driven in the concurrent (or simultaneous) emission method regardless of 2D and 3D (or whether it is displaying 2D or 3D images). Generally, the driving methods are divided into the progressive (or sequential) emission and concurrent (or simultaneous) emission methods. The progressive emission method is to progressively input (or supply) data according to each scan line, and in which pixels progressively emit light in a horizontal line similar to the input order of data (e.g., the pixels emit light one line at a time).

The concurrent (or simultaneous) emission method is to progressively input data according to each scan line, and in which pixels concurrently (or simultaneously) emit light after data is supplied to all the pixels. One frame driven according to one embodiment of the present invention by the concurrent (or simultaneous) emission method is divided into the scan period and an emission period.

The scan period is the period during which the data signals are supplied to each of the pixels 140. In other words, the scan signal is progressively supplied to the scan lines S1 to Sn during the scan period, and the data signal is supplied to the pixels selected by the scan signal. The pixels 140 are set in the non-emission state during the scan period as mentioned above.

The emission period is a period in which the pixels 140 emit light corresponding to the data signal supplied during the scan period.

For the driving method according to one embodiment of the present invention, the pair of 3D shutter glasses (or pair of shutter glasses) display may be easily implemented because the non-emission period (i.e., the scan period) and emission period may be precisely divided.

The pair of 3D shutter glasses displays the left eye image and the right eye image alternately per each frame. A user wears the pair of "shutter glasses" that are switched to 0% and 100% transmittances for the left eye/right eye. The pair of shutter glasses can allow user to recognize (or perceive) an image having a three-dimensional effect by supplying the left eye image to the left eye and the right eye image to the right eye.

When displaying a 2D image using the concurrent (or simultaneous) emission method, an image having more feeling of movement can be displayed by controlling the width of the scan period.

Figure 4:
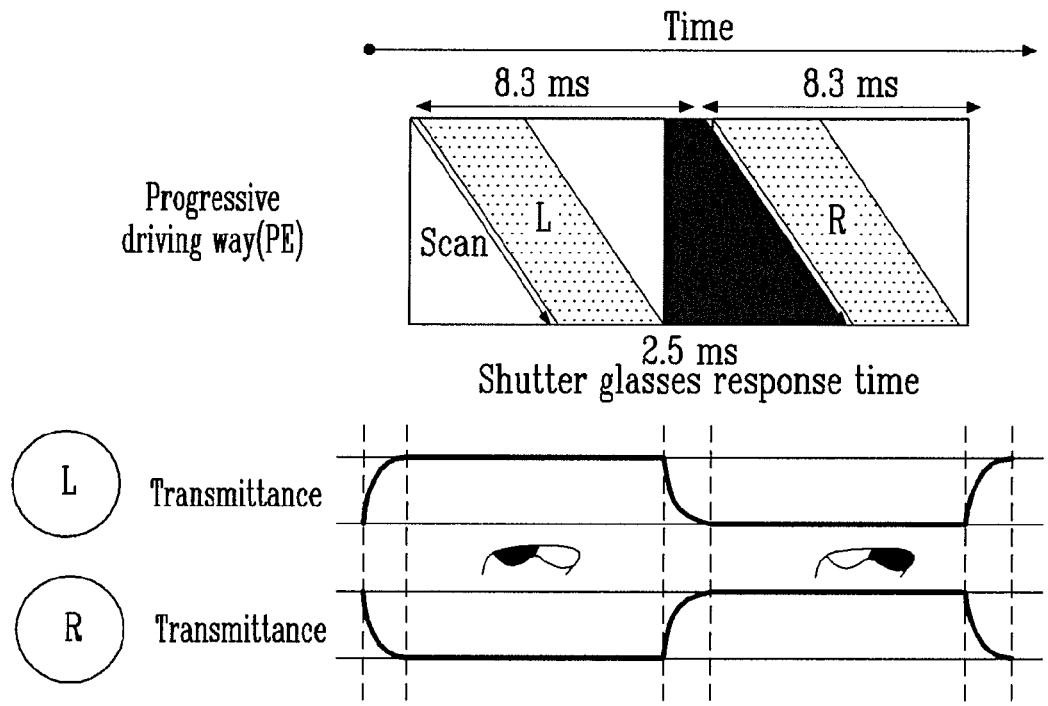
FIG. 4 illustrates timing diagrams for driving a pair of 3D shutter glasses in a progressive emission method.

FIG. 4 illustrates timing diagrams for driving a pair of 3D shutter glasses according to a progressive emission method.

Referring to FIG. 4, the non-emission period (or section) should be inserted for the response time of the pair of shutter glasses (for example, 2.5 ms) in order to prevent a cross talk phenomenon between images of the left eye/right eye when outputting image in the progressive emission method. In other words, the non-emission section is additionally produced for the response time of the pair of shutter glasses between the frame (i-th frame: i is a natural number) outputting the left eye image and the frame ((i+1)-th frame) outputting the right eye image. For this reason, there is a disadvantage that the emission time rate (or duty ratio) is reduced.

Figure 5:
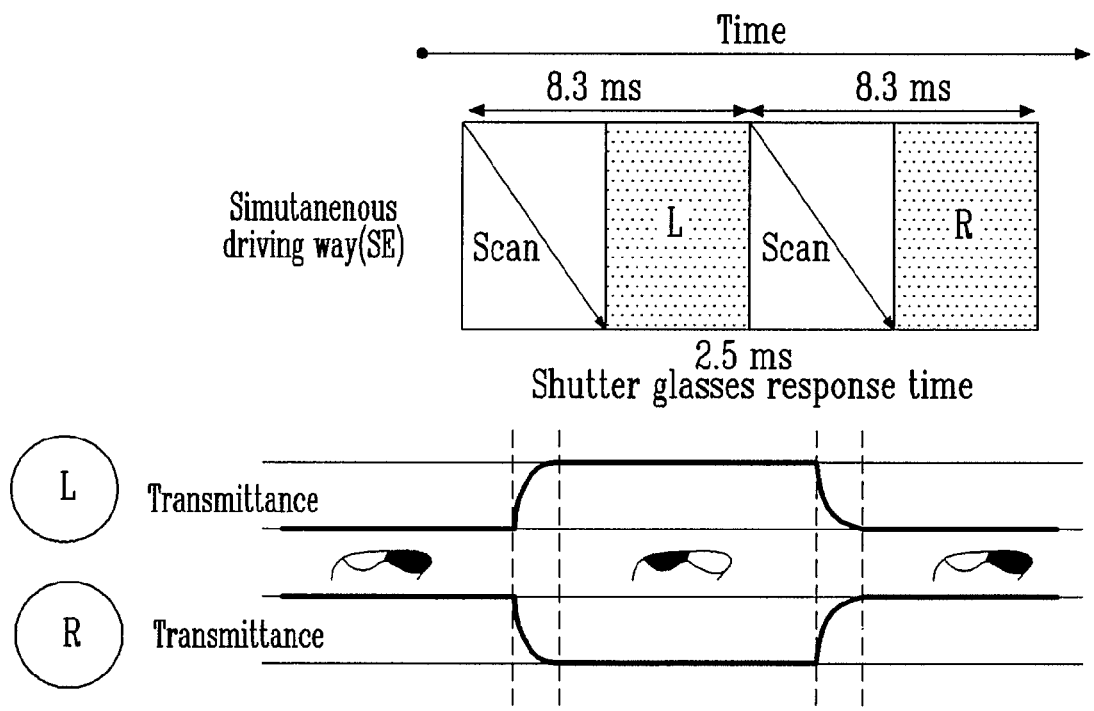
FIG. 5 illustrates timing diagrams for driving a pair of 3D shutter glasses in a concurrent (or simultaneous) emission method according to an embodiment of the present invention.

FIG. 5 illustrates timing diagrams for driving a pair of 3D shutter glasses in a concurrent (or simultaneous) emission method according to an embodiment of the present invention.

Referring to FIG. 5, when outputting image using the concurrent (or simultaneous) emission method, the emission is concurrently (or simultaneously) performed on the whole of the display unit, and the pixels are set in the non-emission state in the section (or period) except for the emission period. Therefore, the non-emission section between the section outputting the left eye image and the section for outputting the right eye image may be naturally secured.

In other words, the pixels 140 are set in the non-emission state during the scan period between i-th frame and (i+1)-th frame, and the emission time ratio (or duty ratio) should not be reduced separately, unlike the conventional progressive emission method, by synchronizing the scan period with the response time of the pair of shutter glasses.

Figure 6A:
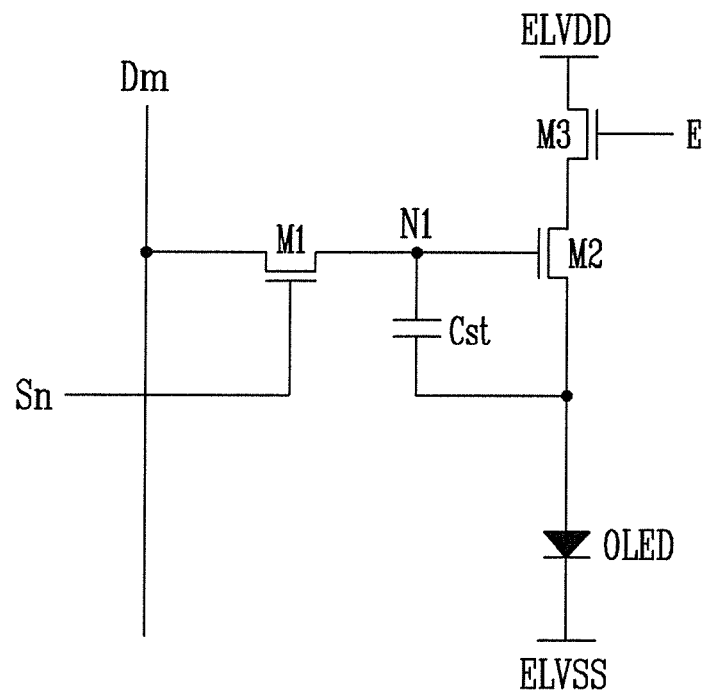
FIG. 6A illustrates a first embodiment of a pixel as depicted in FIG. 1.

FIG. 6A illustrates a first embodiment of a pixel as depicted in FIG. 1. In FIG. 6A, the pixel coupled to an n-th scan line Sn and an m-th data line (Dm) is depicted for convenience of explanation.

Referring to FIG. 6A, a pixel 140 according to the first embodiment of the present invention includes the organic light emitting diode (OLED), a first transistor M1, a second transistor M2, and a third transistor M3.

An anode electrode of the organic light emitting diode (OLED) is coupled to a second electrode of the second transistor M2 (a driving transistor), and a cathode electrode is coupled to the second power driver for supplying the second power ELVSS. The organic light emitting diode (OLED) as mentioned above produces light having luminance corresponding to current supplied from the second transistor M2.

A gate electrode of the first transistor M1 is coupled to the scan line Sn, and a first electrode is coupled to the data line Dm. A second electrode of the first transistor M1 is coupled to a first node N1. The first transistor M1 as mentioned above is turned on to electrically couple the data line Dm to the first node N1 when the scan signal is supplied to the scan line Sn.

A gate electrode of the second transistor M2 is coupled to the first node N1, and a first electrode of the second transistor M2 is coupled to a second electrode of the third transistor M3. The second electrode of the second transistor M2 is coupled to the anode electrode of the organic light emitting diode OLED. The second transistor as mentioned above controls a current that is supplied to the organic light emitting diode OLED in accordance with a voltage supplied to the first node N1.

A first electrode of the third transistor M3 (an emission control transistor) is coupled to the first power driver for supplying the first power ELVDD, and a second electrode is coupled to the first electrode of the second transistor M2. A gate electrode of the third transistor M3 is coupled to the emission control line E. The third transistor M3 as mentioned above is turned on during the period during which the emission control signal is not supplied to the emission control line E. In other words, the third transistor M3 is turned on during the emission period and turned off during the scan period.

Meanwhile, the third transistor according to one embodiment of the present invention blocks the electrical connection between the first power driver for supplying the first power ELVDD and the organic light emitting diode OLED during the scan period in order to reduce or substantially prevent current from flowing to the organic light emitting diode OLED. In one embodiment, the third transistor M3 as mentioned above may be coupled between the second electrode of the second transistor M2 and the anode electrode of the organic light emitting diode OLED as depicted in FIG. 6B.

A storage capacitor Cst is coupled between the gate electrode of the second transistor M2 and the anode electrode of the organic light emitting diode OLED. The storage capacitor Cst as mentioned above is charged with voltage corresponding to the data signal.

Figure 6B:
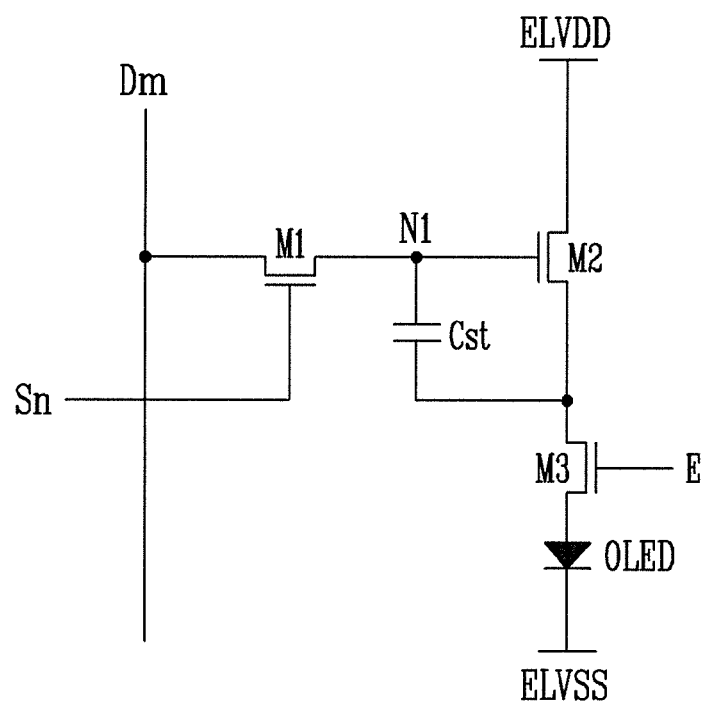
FIG. 6B illustrates another embodiment of a pixel as depicted in FIG. 6A.
Figure 7:
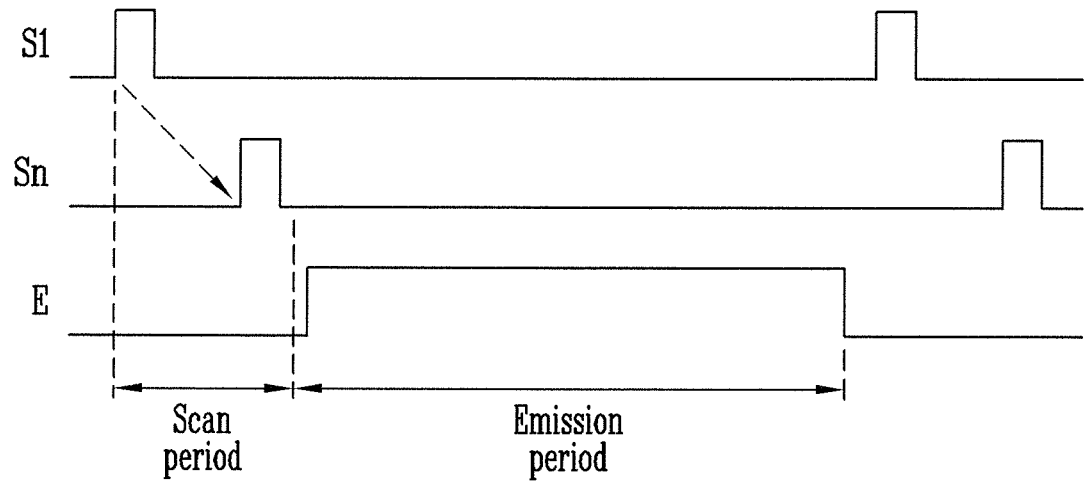
FIG. 7 illustrates a driving method of a pixel as depicted in FIGS. 6A and 6B according to one embodiment of the present invention.

FIG. 7 illustrates a driving method of a pixel as depicted in FIGS. 6A and 6B according to one embodiment of the present invention.

Referring to FIG. 7, the scan signal (or scan signals) is supplied to the scan lines S1 to Sn during the scan period. The emission control signal is supplied to the emission control line E during the scan period.

When supplying the scan signal to the scan line Sn, the first transistor is turned on. When turning on the first transistor M1, the data line Dm and the first node N1 are electrically coupled. The storage capacitor Cst is charged with a voltage corresponding to the data signal. Meanwhile, the third transistor M3 is maintained in the turned-off state because the emission control signal is supplied to the emission control line E during the scan period.

The emission control signal is not supplied to the emission control line E during the emission period. When stopping the supply of the emission control signal to the emission control line E, the third transistor M3 included in each pixel 140 is turned on. When turning on the third transistor M3, a current path from the first power driver through the second transistor M2 and the organic light emitting diode OLED to the second power driver is formed. At this time, the second transistor M2 controls the current that flows to the organic light emitting diode OLED in accordance with the voltage supplied to the first node N1.

Figure 8A:
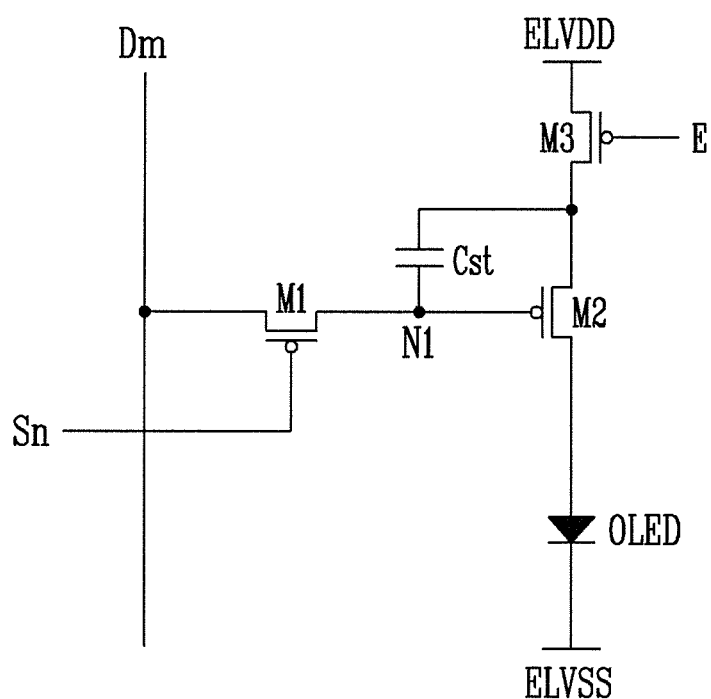
FIG. 8A and FIG. 8B illustrate pixels according to one embodiment of the present invention in which the transistors are PMOS transistors.
Figure 8B:
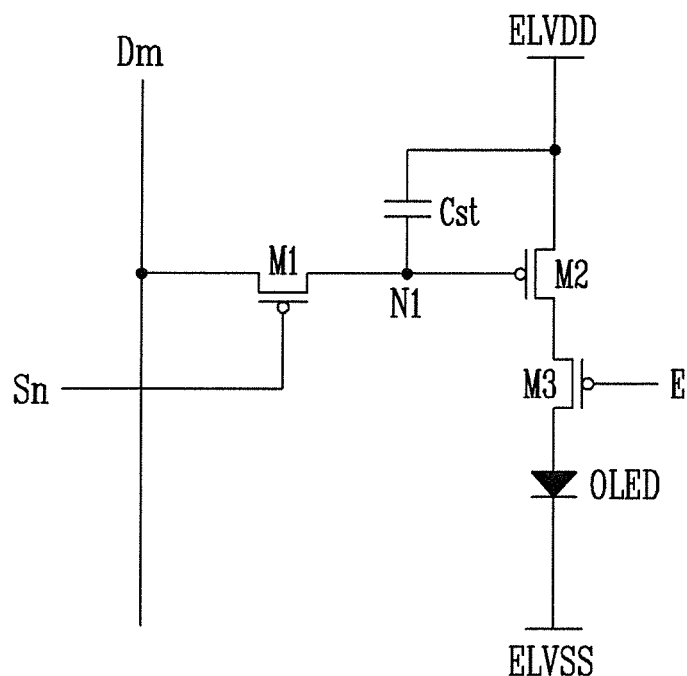
Figure 9:
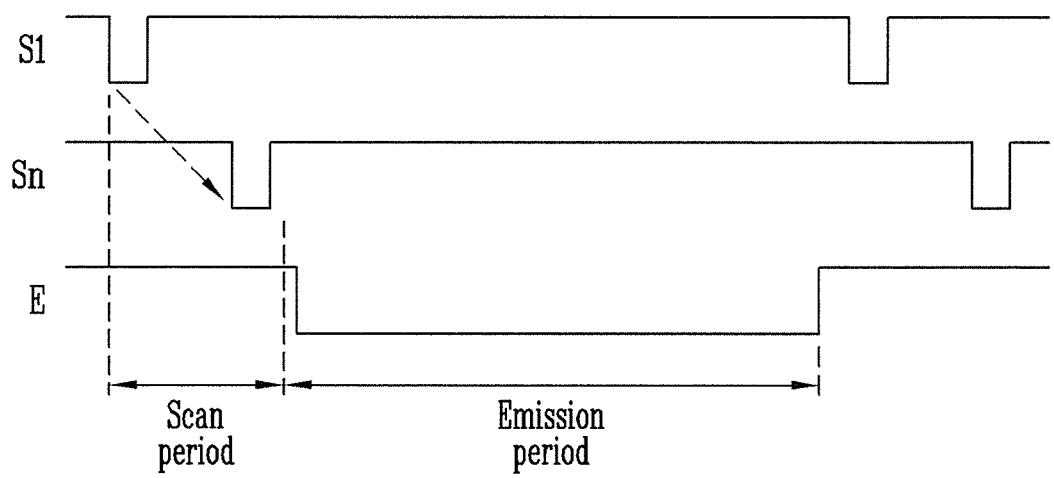
FIG. 9 illustrates a driving method of a pixel as depicted in FIGS. 8A and 8B according to one embodiment of the present invention.

In FIG. 6A and FIG. 6B, the pixels 140 include NMOS transistors M1, M2, and M3, but embodiments of the present invention will not be limited thereto. For example, as depicted in FIGS. 8A and 8B, the transistors M1 to M3 may be formed as PMOS transistors. In this case, the storage capacitor Cst is formed between the gate electrode of the second transistor M2 and the first electrode of the second transistor M2, but otherwise has a substantially similar circuit configuration. When the transistors M1, M2, and M3 are PMOS transistors, the polarity of driving waveform is reversed, as depicted in FIG. 9.

Figure 10:
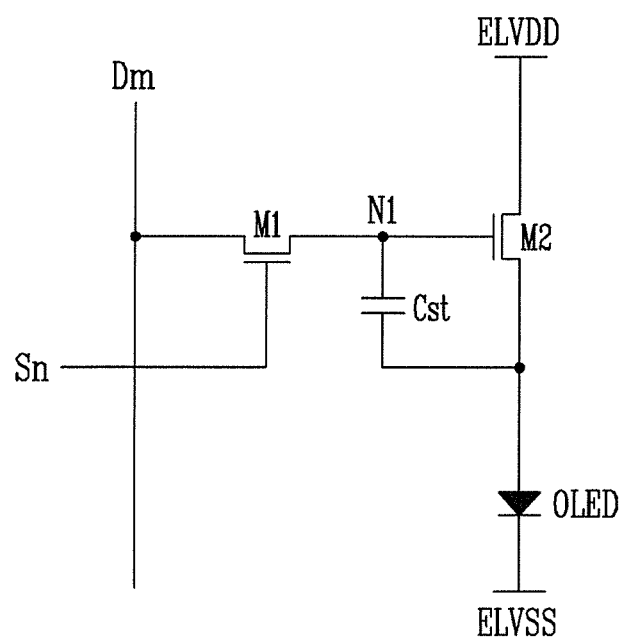
FIG. 10 illustrates a second embodiment of a pixel as depicted in FIG. 1.

FIG. 10 illustrates a second embodiment of a pixel as depicted in FIG. 1. For FIG. 10, the pixel coupled to the n-th scan line Sn and the m-th data line Dm is depicted for convenience of explanation.

Referring to FIG. 10, the pixel 140 according to the second embodiment of the present invention includes the organic light emitting diode OLED, the first transistor M1, and the second transistor M2.

The anode electrode of the organic light emitting diode OLED is coupled to the second electrode of the second transistor M2, and the cathode electrode is coupled to the second power driver for supplying the second power ELVSS. The organic light emitting diode OLED as mentioned above produces light having luminance corresponding to current supplied from the second transistor M2.

A gate electrode of the first transistor M1 is coupled to the scan line Sn, and a first electrode is coupled to the data line Dm. A second electrode of the first transistor M1 is coupled to the first node N1. The first transistor M1 as mentioned above is turned on when supplying the scan signal to the scan line Sn to electrically couple the data line Dm to the first node N1.

The gate electrode of the second transistor M2 is coupled to the first node N1, and the first electrode is coupled to the first power driver supplying the first power ELVDD. The second electrode of the second transistor M2 is coupled to the anode electrode of the organic light emitting diode OLED. The second transistor M2 as mentioned above controls current that is supplied to the organic light emitting diode OLED in accordance with a voltage supplied to the first node N1.

The storage capacitor Cst is coupled between the gate electrode of the second transistor M2 and the anode electrode of the organic light emitting diode OLED. The storage capacitor Cst as mentioned above is charged with a voltage corresponding to the data signal.

Figure 11A:
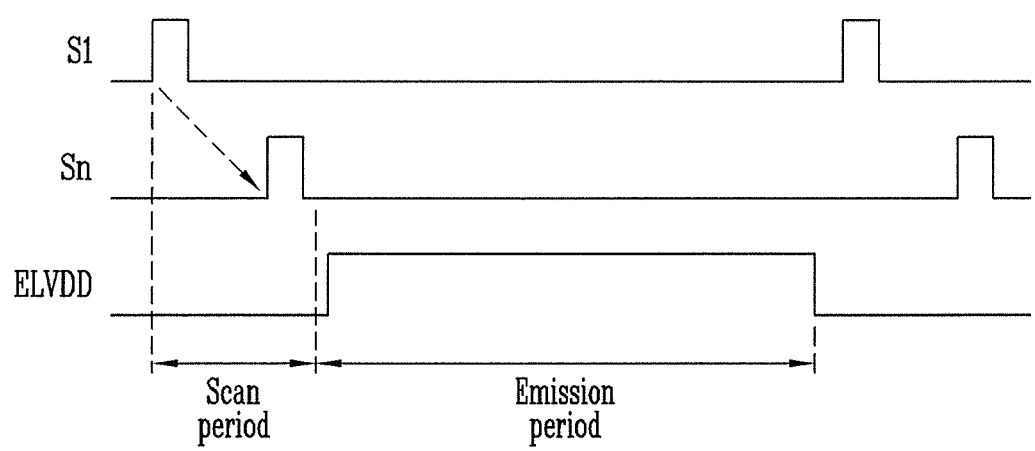
FIGS. 11A and 11B illustrate a driving method of a pixel as depicted in FIG. 10.

FIG. 11A is a waveform diagram illustrating a driving method of a pixel as depicted in FIG. 10.

Referring to FIG. 11A, the scan signal is progressively supplied to the scan lines S1 to Sn during the scan period. The voltage of the first power ELVDD is set at a low level during the scan period.

When supplying the scan signal to the scan line Sn, the first transistor M1 is turned on. When the first transistor M1 is turned on, the data line Dm and the first node N1 are electrically coupled. When the data line Dm and the first node N1 are electrically coupled, the data signal is supplied to the first node N1 from the data line Dm. The storage capacitor Cst is charged with voltage corresponding to the data signal. Meanwhile, the pixel 140 is set in the non-emission state because the first power ELVDD is set at the low level voltage during the scan period.

In this case, the second power ELVSS may be set at the high level voltage in order to set the pixel 140 in the non-emission state during the scan period as depicted in FIG. 6B. In other words, for one embodiment of the present invention, voltage of the first power ELVDD is set at the low level, or voltage of the second power ELVSS is set at the high level, so that the pixel 140 may be set up in the non-emission state.

Figure 11B:
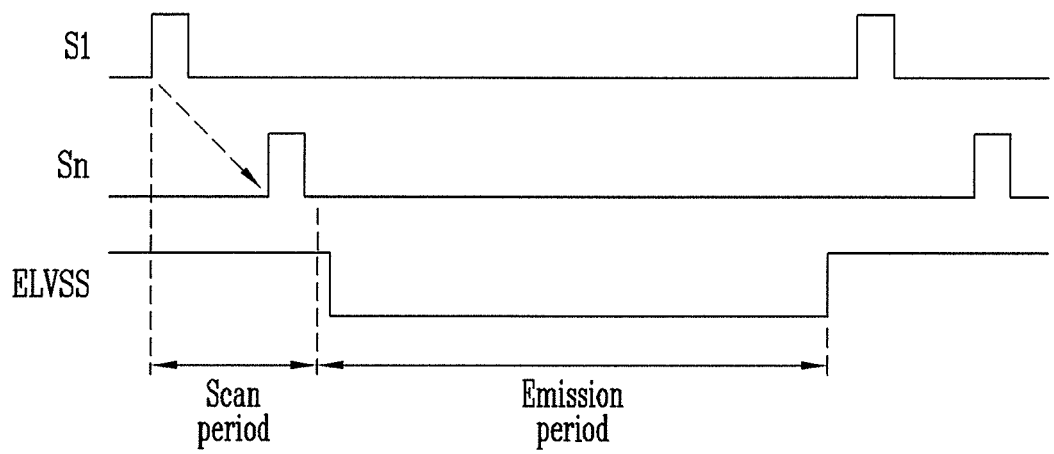

The first power ELVDD is set at the high level during the emission period (for FIG. 11B, the voltage of the second power ELVSS is set at the low level). The second transistor M2 controls the current that flows to the second power ELVSS via the organic light emitting diode OLED from the first power ELVDD in accordance with the voltage supplied to the first node N1.

Figure 12:
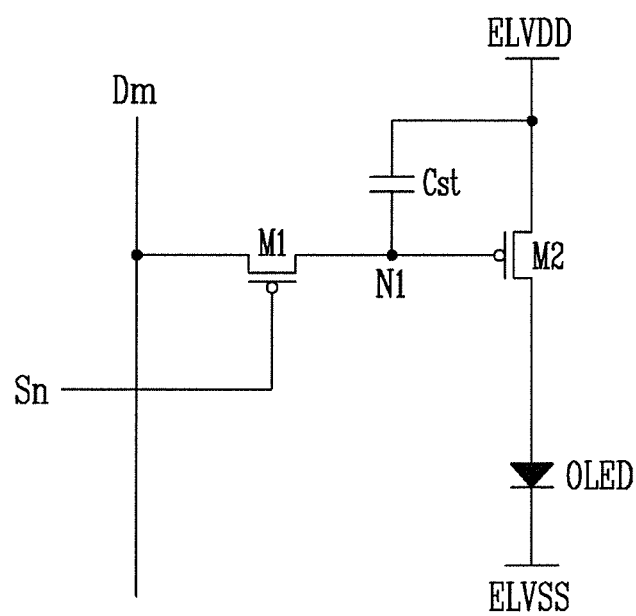
FIG. 12 illustrates pixels according to one embodiment of the present invention in which the transistors are PMOS transistors.
Figure 13A:
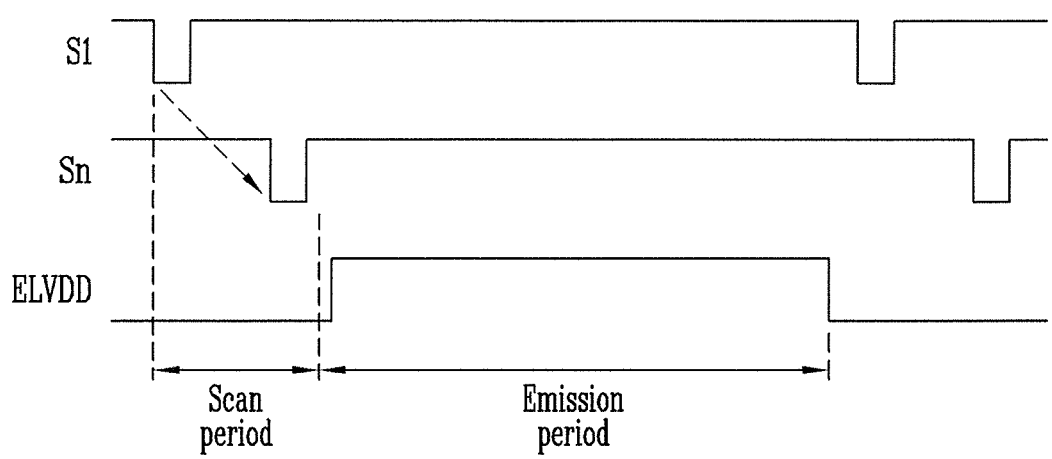
FIGS. 13A and 13B illustrate a driving method of a pixel as depicted in FIG. 12.
Figure 13B:
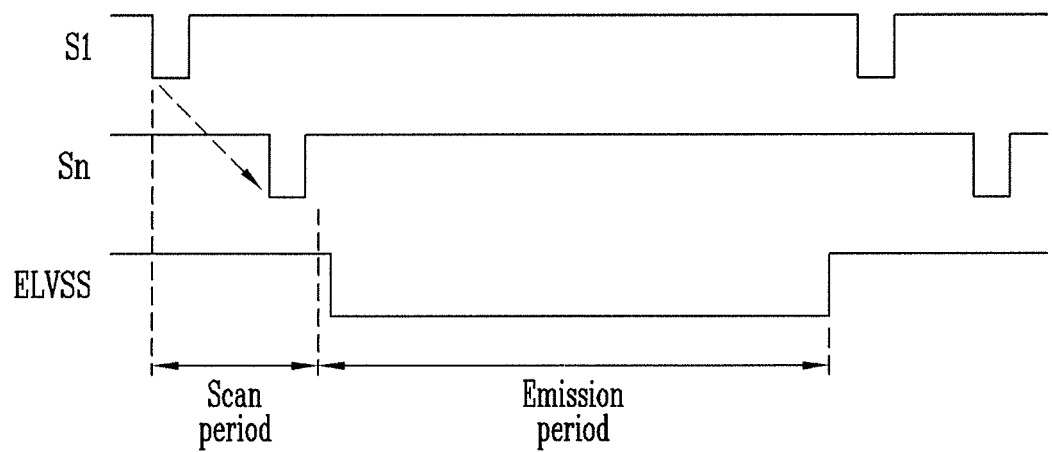

Meanwhile, for the embodiment shown in FIG. 10, the transistors M1, M2 included in the pixels 140 are NMOS transistors, but embodiments of the present invention are not limited thereto. For example, the transistors M1, M2 may be formed as PMOS transistors, as depicted in FIG. 12. In this case, the storage capacitor Cst is formed between the gate electrode of the second transistor M2 and the first electrode of the second transistor M2, and the circuit configuration may be otherwise substantially the same. However, when the transistors M1, M2 are formed as PMOS transistors, the polarity of driving waveform is reversed as depicted in FIGS. 13A and 13B.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
   a scan driver for supplying a scan signal to a plurality of scan lines;
   a data driver for supplying a data signal to a plurality of data lines;
   a plurality of pixels located at crossing regions between the scan lines and the data lines, for controlling a current flowing from a first power driver to a second power driver via an organic light emitting diode in accordance with the data signal;
   a data processor for classifying data of one frame supplied from outside the organic light emitting display device as one of 2D data and 3D data, for, when the data of the one frame is 2D data, producing 2D data of at least two frames by using the 2D data of the one frame, and for, when the data of the one frame is 3D data, producing 3D data of at least two frames by using the 3D data of the one frame; and
   a timing controller for transmitting the produced 2D or 3D data supplied from the data processor to the data driver, wherein the timing controller is configured to set all of the pixels of all of the scan lines concurrently in a non-emission state during a scan period during which the scan signal is supplied to the scan lines during one frame period, wherein the data processor comprises:
a data divider for classifying the data into 2D or 3D data by using a distinguishing bit of the data supplied from the outside;
a 3D data processor for producing data for a frame corresponding to a left eye image and data for a frame corresponding to a right eye image by using 3D data of one frame;
a 2D data processor for producing data for at least two frames by using 2D data of one frame; and
a data transmitter for transmitting data from the 3D data processor and the 2D data processor to the timing controller,
wherein the data processor is configured to receive data from outside at a first driving frequency and is configured to transmit 3D data and 2D data to the timing controller at a second driving frequency, and
wherein the second driving frequency is greater than the first driving frequency.

2. The organic light emitting display device as claimed in claim 1, wherein the first driving frequency is 60 Hz and the second driving frequency is 120 Hz.

3. The organic light emitting display device as claimed in claim 1, further comprising:
a wireless transmitter coupled to the timing controller, the wireless transmitter being for transmitting a wireless signal corresponding to the scan period; and
a pair of shutter glasses that is configured to synchronize a response period with the scan period in accordance with the wireless signal.

4. The organic light emitting display device as claimed in claim 1, further comprising:
the first power driver for supplying a first power; and
the second power driver for supplying a second power.

5. The organic light emitting display device as claimed in claim 4, wherein the timing controller is configured to control the first power driver to supply the first power at a low level during the scan period during one frame and the first power at a high level during an emission period.

6. The organic light emitting display device as claimed in claim 4, wherein the timing controller is configured to control the second power driver to supply the second power at a high level during the scan period of one frame and to supply the second power at a low level during an emission period of the one frame.

7. The organic light emitting display device as claimed in claim 1 further comprising an emission control line coupled to the pixels in common, wherein the timing controller is configured to control the scan driver to supply an emission control signal to the emission control line during the scan period.

8. The organic light emitting display device as claimed in claim 7, wherein each of the pixels comprises;
the organic light emitting diode;
a driving transistor configured to control a current supplied to the organic light emitting diode; and
an emission control transistor that is coupled between the driving transistor and the first power driver or between the driving transistor and the organic light emitting diode, and is configured to be turned off when the emission control signal is supplied.

9. A method for driving an organic light emitting display device, comprising:
supplying data from outside the organic light emitting display device;
classifying the data of one frame into one of 2D data and 3D data in accordance with a distinguishing bit of the data;
producing data of a frame corresponding to a left eye image and data of a frame corresponding to a right eye image by using the 3D data of the one frame when classifying into 3D data and producing data of two frames by using the 2D data of the one frame when classifying into 2D data;
producing a data signal by using the produced 3D data or the produced 2D data;
setting all pixels of a plurality of pixels of all of a plurality of scan lines concurrently in a non-emission state during a scan period for supplying the data signal to the pixels during one frame period, the pixels being arranged in a plurality of adjacent rows;
setting the pixels to emit light in accordance with the data signal during an emission period, the emission period being separated in time from the scan period; and
controlling a current flowing from a first power driver to a second power driver via the organic light emitting diode during the emission period using the pixels in accordance with the data signal,
wherein each of the pixels comprises a control transistor coupled between the organic light emitting diode and the first power driver, and
wherein the method further comprises turning off the control transistor during the scan period and turning on the control transistor during the emission period.

10. The method for driving the organic light emitting display device as claimed in claim 9, the method further comprising setting a voltage of the first power driver at a low level during the scan period, and setting the voltage of the first power driver at a high level during the emission period.

11. The method for driving the organic light emitting display device as claimed in claim 9, the method further comprising setting a voltage of the second power driver at a high level during the scan period, and setting the voltage of the second power driver at a low level during the emission period.

12. The method for driving the organic light emitting display device as claimed in claim 9, wherein an i-th (here, i is a natural number) frame comprises the left eye image and an (i+1)-th frame comprises the right eye image when displaying an image using the 3D data.

13. The method for driving the organic light emitting display device as claimed in claim 12, the method further comprising synchronizing the scan period between an emission period of the i-th frame and an emission period of the (i+1)-th frame with a response period of a pair of shutter glasses.

* * * * *